| United States Patent [19] | [11] | 4,178,171 |
|---|---|---|
| Steck et al. | [45] | Dec. 11, 1979 |

[54] MANUFACTURE OF ACICULAR FERROMAGNETIC IRON PARTICLES

[75] Inventors: Werner Steck, Mutterstadt; Rudolf Brodt, Weinheim; Wilhelm Sarnecki, Limburgerhof; Helmut Jakusch, Frankenthal; Manfred Ohlinger, Frankenthal; Eberhard Koester, Frankenthal, all of Fed. Rep. of Germany

[73] Assignee: BASF Aktiengesellschaft, Fed. Rep. of Germany

[21] Appl. No.: 888,508

[22] Filed: Mar. 20, 1978

[30] Foreign Application Priority Data

Apr. 1, 1977 [DE] Fed. Rep. of Germany ....... 2714588

[51] Int. Cl.$^2$ .............................................. B22F 9/00
[52] U.S. Cl. ................................ 75/0.5 AA; 75/108; 148/105; 252/62.56; 252/62.63; 423/633
[58] Field of Search ............. 75/0.5 BA, 0.5 AA, 108; 148/105; 252/62.63, 62.56; 423/633

[56] References Cited

U.S. PATENT DOCUMENTS

| 3,382,174 | 5/1968 | Hund .............................. 252/62.56 X |
| 3,607,220 | 9/1971 | van der Giessen et al. .... 75/0.5 AA |
| 3,904,540 | 9/1975 | Bennetch et al. ................. 423/633 X |
| 3,946,103 | 3/1976 | Hund .................................... 423/633 |
| 4,017,303 | 4/1977 | Koester et al. ,.................. 75/0.5 AA |
| 4,050,962 | 9/1977 | Koester et al. ........................ 148/105 |
| 4,066,726 | 12/1977 | Ohlinger et al. ...................... 423/634 |

*Primary Examiner*—G. Ozaki
*Attorney, Agent, or Firm*—Keil & Witherspoon

[57] ABSTRACT

A process for the manufacture of acicular ferromagnetic iron particles by reducing acicular iron(III) oxide hydroxides which consist of pure synthetic lepidocrocite or a mixture of synthetic goethite and at least 70% by weight of synthetic lepidocrocite.

The iron(III) oxide hydroxides used carry, on their surface, an alkaline earth metal cation and an anion of a monobasic, dibasic or tribasic aliphatic carboxylic acid of up to 6 carbon atoms or an organic compound containing at least two groups capable of chelating the alkaline earth metal cation, and are produced in such a way that they consist of at least 70 percent by weight of lepidocrocite and have a length-to-width ratio of not less than 15:1.

Reduction of such iron(III) oxide hydroxides gives iron particles with pronounced shape anisotropy, which exhibit both good magnetic properties and a narrow field strength distribution.

5 Claims, No Drawings

MANUFACTURE OF ACICULAR FERROMAGNETIC IRON PARTICLES

The present invention relates to a process for the manufacture of acicular ferromagnetic iron particles having high specific remanence and specific saturation magnetization values, a high coercive force and a narrow field strength distribution.

Ferromagnetic metal powders and thin metal layers are of particular interest for the manufacture of magnetic recording media, because of their high saturation magnetization and the high coercive force achieved. This is related to the fact that they enable the energy product and the information density to be substantially increased, so that, inter alia, narrower signal widths and higher signal amplitudes are achievable with such recording media.

It is true that when using acicular ferromagnetic metal powders as magnetizable materials for the manufacture of magnetic recording media the mechanical properties of such media can, in contrast to the use of homogeneous thin metl layers, be varied within wide limits by appropriate choice of the polymeric organic binder system, but in that case high demands are made not only on their magnetic properties but also on their shape, size and dispersibility.

Since a high coercive force and a high residual induction are essential prerequisites for magnetic pigments intended for magnetic coatings serving as data storage memories, the metal particles employed must exhibit single-domain behavior and furthermore the anisotropy already present or additionally achievable by magnetic orientation in the tape, should only be slightly affected by external factors, e.g. temperature or mechanical stresses, i.e. the small particles should exhibit shape anisotropy and preferably be of acicular shape, and should in general have a size of from $10^2$ to $10^4$ Å.

It has been disclosed that this type of ferromagnetic metal particles exhibiting shape anisotropy can be manufactured by deposition of metal on a mercury cathode (J. Electrochem. Soc., 10 S, 113 S (1961)). This process requires a large number of special technical measures and is therefore expensive. Reduction of, for example, iron salts by means of hydrides (J. Appl. Phys., 32, 184 S (1961)) and vacuum vaporization of metals with subsequent deposition as whiskers (J. Appl. Phys., 34 2905 (1963)) have also been disclosed, but are of no industrial importance. Further, it has been disclosed that metal powders of the above type can be manufactured by reducing finely divided acicular metal compounds, e.g. oxides, with hydrogen or some other gaseous reducing agent. The reduction must be carried out at above 350° C. if it is to take place at an industrially acceptable speed. However, this is attended by the problem of sintering of the resulting metal particles. As a result, the particle shape no longer conforms to that required to give the desired magnetic properties.

To lower the reduction temperature it has already been proposed, in U.S. Pat. No. 3,627,509, to catalyze the reduction by applying silver or silver compounds to the surface of finely divided iron oxide. The treatment of iron oxide with tin (II) chloride has also been disclosed in U.S. Pat. No. 3,607,220.

However, the catalytic acceleration of the reduction of perferably acicular starting compounds generally produces needles which are much smaller than those of the starting material, and furthermore the length-to-width ratio is low. Consequently, the end product exhibits a fairly broad particle size spectrum. On the other hand, the literature discloses that the dependence of the coercive force and residual induction of magnetic materials on their particle size is very great when the particles are of a size of the order of magnitude of single-domain particles (Kneller, Ferromagnetismus, Springer-Verlag 1962, page 437 et seq.). If to this are added the effects resulting from the presence of a proportion of superparamagnetic particles which may be formed as fragments when using the above process, the resulting magnetic pigments are highly unsuitable (for example because of their poor maximum output level at short wavelengths) for use in the manufacture of magnetic recording media. With such heterogeneous mixtures, the magnetic field strength required to reverse the magnetization of the particles varies greatly, and the distribution of the residual magnetization as a function of the applied external field also results in a less steep residual induction curve.

It is therefore an object of the present invention to provide a process for the manufacture of acicular ferromagnetic iron particles, by means of which process uniform particles with pronounced shape anisotropy, which exhibit both a narrow field strength distribution and good magnetic properties, can be obtained in a simple and economical manner.

We have found that acicular ferromagnetic iron particles having the required properties can be obtained by reducing an acicular iron(III) oxide hydroxide, which carries, on its surface, an alkaline earth metal cation selected from the group consisting of calcium, strontium and barium, and an anion of a monobasic, dibasic or tribasic aliphatic carboxylic acid of up to 6 carbon atoms, or an organic compound containing at least two groups capable of chelating the alkaline earth metal cation, by means of hydrogen at from 275° to 380° C., if the acicular iron(III) oxide hydroxide employed has a length-to-width ratio of at least 15:1 and consists of at least 70% by weight of lepidocrocite.

It is particularly advantageous to use an acicular iron(III) oxide hydroxide which has a length-to-width ratio of at least 15:1 and consists of lepidocrocite or a mixture of goethite and at least 70% by weight of lepidocrocite in the process according to the invention.

The acicular iron(III) oxide hydroxides employed for the process according to the invention, e.g. lepidocrocite or a mixture of goethite and at least 70% by weight of lepidocrocite, can be prepared under suitable reaction conditions by treating iron(II) salt solutions with alkalis, oxidation being effected at the same time. It has proved particularly advantageous to obtain iron(III) oxide hydroxide nuclei from an aqueous iron(II) chloride solution using alkalis, such as an alkali metal hydroxide or ammonia, at from 10° to 32° C., with vigorous stirring to produce fine air bubbles, up to an amount of from about 25 to 60 mole percent of the iron employed, and then to produce the iron(III) oxide hydroxide from the nuclei, by growth of the latter, at from 25° to 70° C. and a pH of from 4.0 to 5.8 which is set up by adding further amounts of alkali, whilst vigorously dispersing the air present. After nuclei growth has stopped, the content of iron(III) oxide hydroxide in the aqueous suspension should be from 10 to 50 g/l, preferably from 15 to 45 g/l. After filtering off and washing the precipitate, the iron(III) oxide hydroxide thus obtained is dried at from 60° to 200° C.

Using the procedure given by way of example, stable acicular particles of the goethite-lepidocrocite mixture, containing at least 70% by weight of lepidocrocite, which exhibit virtually no dendritic branching, may be obtained.

The acicular iron(III) oxide hydroxides, e.g. lepidocrocite or a goethite-lepidocrocite mixture, which may be used for the process according to the invention, have a mean particle length of from 0.2 to 1.5, preferably from 0.3 to 1.2, μm and a length-to-width ratio of at least 15:1, advantageously from 18 to 40:1, the surface area of the particles, measured by the BET method, being from 32 to 80 m²/g.

The acicular iron(III) oxide hydroxides suitable as starting material for the process according to the invention, e.g. lepidocrocite or a mixture of goethite and lepidocrocite, are treated, before reduction, with an alkaline earth metal cation and a carboxylic acid or some other organic compound which contains at least two groups capable of chelating the alkaline earth metal cation.

Suitable carboxylic acids for this treatment are saturated or unsaturated aliphatic carboxylic acids of up to 6 carbon atoms and containing up to 3 acid radicals, in which acids one or more hydrogens of the aliphatic chain may be substituted by hydroxyl or amino. Particularly suitable acids are oxalic acid and hydroxydicarboxylic and hydroxytricarboxylic acids, e.g. tartaric acid or citric acid. The alkaline earth metal cation applied to the iron(III) oxide hydroxide simultaneously with, and in equivalent amounts to, the carboxylic acid is selected from the group consisting of calcium, barium and strontium, barium being preferred.

The treatment of the acicular particles is advantageously carried out by dispersing these together with a soluble alkaline earth metal compound and the carboxylic acid in a solvent which is suitable for the substances to be applied to the iron(III) oxide hydroxide and which can subsequently be removed easily. It is advantageous to use water or a lower alcohol. In another embodiment, an alkaline earth metal salt of the carboxylic acid is first formed, then added, in solution, to the solids suspension, and finally applied to the particles by evaporating off the solvent.

Instead of the above carboxylic acids, an organic compound capable of forming chelate complexes can be applied, together with the alkaline earth metal cation, to the acicular iron(III) oxide hydroxide. Suitable compounds must contain at least two functional groups selected from the group consisting of primary, secondary and tertiary amino radicals, imino radicals, carbonyl radicals, carboxyl radicals and hydroxyl radicals. Suitable substances are β-diketones containing at least one methylene hydrogen between the carbonyl groups and having the general formula

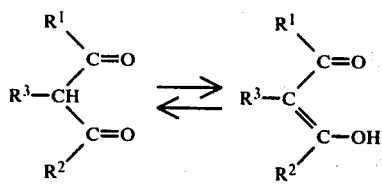

where $R^1$ and $R^2$ are alkyl of 1 to 24 carbon atoms or are aryl and $R^3$ is H or has one of the meanings of $R^1$, e.g. acetylacetone, methylacetylacetone, ethylacetylacetone, propylacetylacetone, phenylacetylacetone, propionylacetone, dipropionylmethane, benzoylacetone, dibenzoylmethane, methylbenzoylacetone, methyldibenzoylmethane and β-ketocarboxylic acid esters which contain at least one methylene hydrogen between the keto group and the carboxyl group and have the general formula

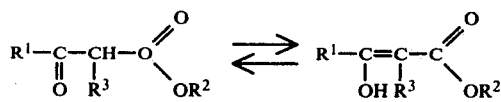

where $R^1$, $R^2$ and $R^3$ have the above meanings, e.g. methyl acetoacetate, ethyl acetoacetate, propyl acetoacetate, isopropyl acetoacetate, butyl acetoacetate, isobutyl acetoacetate, t-butyl acetoacetate, amyl acetoacetate, hexyl acetoacetate, nonyl acetoacetate and decyl acetoacetate, aminoacetic acids or aminopropionic acids containing the group

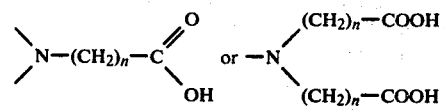

where n is 1 to 2, e.g. ethylenediaminetetraacetic acid, ethylenediaminetetrapropionic acid, nitrilotriacetic acid, iminodiacetic acid, iminodipropionic acid, melaminehexaacetic acid, melaminehexapropionic acid or their alkali metal salts, and also compounds which contain the group

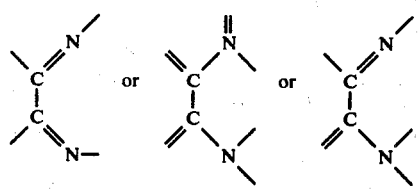

e.g. dimethylglyoxime, diaminoglyoxime, benzildioxime, bisimidazolinyl, bis-tetrahydropyrimidinyl, α,α-dipyridyl, ethylenediamine, diethylenetriamine and triethylenetetramine.

Particularly advantageous substances for chelate formation have proved to be acetylacetone from amongst β-diketones, ethyl acetoacetate from amongst β-ketocarboxylic acid esters and ethylenediaminetetraacetic acid from amongst aminoacids.

The alkaline earth metal cation and the organic compound capable of chelate formation are applied in the same manner as that described for the treatment with the alkaline earth metal cation and a carboxylic acid.

In the course of the development of the process according to the invention it was found advantageous to apply, to the goethite-lepidocrocite mixture or the lepidocrocite, in each case from 0.2 to 10, preferably from 2 to 8, percent by weight, based on the amount of material to be treated, of an alkaline earth metal compound and a carboxylic acid or one of the above organic compounds.

The iron(III) oxide hydroxides, e.g. lepidocrocite or a goethite-lepidocrocite mixture, which have been treated in this way are then reduced in the conventional manner by passing hydrogen over the material at from 275° to 380° C., preferably from 300° to 350° C. It is advisable to passivate the finely divided iron powders thus obtained by passing a mixture of oxygen and an inert gas over them if the pyrophoric nature of the extremely fine powder is an impediment during further processing.

Using the process according to the invention it is possible to manufacture acicular ferromagnetic iron particles which are distinguished by pronounced shape anisotropy. The iron particles obtained according to the invention are particularly distinguished, compared to iron particles obtained by reducing pure goethite or pure compact lepidocrocite, by improved specific remanence and specific saturation magnetization values and a higher coercive force, as well as by a narrower field strength distribution and by better orientability.

If the iron particles obtained in accordance with the invention are used in the conventional manner for the manufacture of magnetic recording media, the acicular particles can be particularly easily oriented magnetically; furthermore, important electroacoustic properties, e.g. the maximum output levels at long and short wavelengths, are improved. At the same time, high reference level-to-weighted noise ratios are achieved.

The experiments described below illustrate the process according to the invention and the comparative experiments demonstrate the advance in the art that has been achieved.

The acicular iron(III) oxide hydroxides employed according to the invention, e.g. lepidocrocite or a goethite-lepidocrocite mixture, were primarily characterized by the surface area $S_{N2}$ determined by the BET method using nitrogen. Electron micrographs provided information on the appearance and dimensions (length-to-width ratio) of the iron oxide hydroxide particles. Measurement of the wetting volume was also employed as a further method of determining the particle shape.

The wetting volume makes it possible to estimate the mean particle length by determining the interstital volume of the loosely heaped pigment. A small amount of pigment on a frit is allowed to absorb dioxane until saturated. The wetting volume determined in this way decreases monotonously as the specific surface area increases if the shape of the acicular particles (the length-to-width ratio) remains constant. If the particles vary in shape, the effect of the length-to-width ratio is superimposed on the above trend. For example, for a constant specific surface area, long acicular particles exhibit a high interstitial volume, because of their bulkiness, whilst a short and broad particle shape results in good packing and hence a low wetting volume.

The magnetic properties of the iron powders were measured by means of a vibrating sample magnetometer at a field strength of 160 or 800 kiloamps/m. The coercive force, $H_c$, measured in kiloamps/m, was determined on the basis of a tap density $\rho$ of 1.6 g/cm$^3$. The specific remanence and specific saturation magnetization are each quoted in nTm$^3$/g.

In addition to a high coercive force $H_c$ and a high residual induction, the remanence coercivity $H_R$ is an important parameter for assessing the materials. In d.c. demagnetization, half (by volume) of the particles are reverse-magnetized at a field strength which is equal to the remanence coercivity $H_R$. Accordingly, $H_R$ is a characteristic parameter for recording processes, which in particular determines the bias setting for magnetic recording. The more non-uniform the remanence coercivity of the individual magnetic particles in the recording layer is, the broader is the distribution of the magnetic fields which are able to reverse the magnetization of a defined volume of the recording layer. This is particularly noticeable if, because of high recording densities or short wavelengths, the boundary zone between zones of opposite magnetization is narrow. To characterize the distribution of the field strengths of the individual particles, a value $h_5$ for the total width of the residual induction curve and a value $h_{25}$ for the slope of the residual induction curve are determined from the d.c. demagnetization curve. These values are determined using the equations $h_5 = (H_{95} - H_5)/H_R$ and $h_{25} = (H_{75} - H_{25})/H_R$ and The subscript following the letter H indicates what percentage of the particles has in each case been reverse-magnetized.

The invention is further illustrated by the following Examples.

EXAMPLE 1

1,112 g of FeSO$_4$.7H$_2$O (4 moles) are mixed with fully demineralized water to give 4 l of solution and the latter is introduced into a 6 l reaction vessel and heated to 25° C. whilst passing nitrogen at the rate of 200 l/h through the solution. 96 g of NaOH (2.4 mole), dissolved in water to give 1 l of solution, are introduced in the course of 10 minutes whilst stirring at 300 rpm and continuing to pass in nitrogen. This raises the pH to 7.4.

The precipitate of Fe(OH)$_2$ is then immediately oxidized at 25° C. by passing air at the rate of 40 l/h through the mixture and stirring at 300 rpm. The end of the oxidation is indicated by the rapid drop in the pH to 3 and by the yellow color of the suspension of nuclei. The oxidation time is 6 hours.

The suspension is then heated to 50° C. in the course of about 30 minutes, whilst continuing to stir the mixture and pass air through it. The amount of air is then raised to 500 l/h, the pH is raised from 3 to 5 in the course of 10 minutes by the dropwise addition of aqueous sodium hydroxide solution, and the mixture is kept at pH 5 for 20 hours, at which stage the reaction has ended.

The goethite suspension is then poured onto a suction filter and the product is washed until the filtrate is sulfate-free and is then dried in a cabinet dryer at 130° C.

EXAMPLE 2

The procedure followed was as in Example 1, with the following changes: 556 g of FeSO$_4$.7H$_2$O (2 moles) were used and precipitated to the extent of 30% with 48 g of NaOH (1.2 moles). The nuclei were formed at 23° C.; during their formation, air was already being passed in at the rate of 500 l/h. The nuclei took 85 minutes to form. Growth took place at 83° C. and required 155 minutes.

EXAMPLE 3

7.31 moles of FeCl$_2$ (926.6 g) are dissolved in fully demineralized water in a 26 l reaction vessel to give 9 l of solution, and the latter is brought to 18° C. whilst passing nitrogen therethrough at the rate of 500 l/h. 7.38 moles of NaOH (295.2 g) dissolved in 4.5 l of fully demineralized water are then added in the course of 30–40 minutes whilst stirring at 500 rpm. After completion of the addition of NaOH, the mixture is stirred for 10 minutes and thereafter air, at the rate of 150 l/h, is passed into the mixture, in place of nitrogen, until the pH has fallen to about 3.4. In this way, an orange suspension of nuclei is obtained after 150 minutes.

This suspension is then heated to 40° C. whilst continuing to stir it at 500 rpm and passing air at the rate of 150 l/h through it. When 40° C. has been reached, the amount of air is increased to 400 l/h and the pH is kept at 4, up to the end of the reaction, by running in aqueous sodium hydroxide solution. Growth takes 160 minutes.

The lepidocrocite suspension is washed with water on a suction filter until the filtrate is chloride-free, and is then dried in a cabinet dryer at 130° C. Samples 4-9 were washed and dried in the same way.

EXAMPLES 4-6

These experiments were carried out as described in Example 3, except that the nuclei were formed at 22°-26° C.

EXAMPLE 7

This experiment was carried out as described in Examples 4-6, but in a 700 l reaction vessel (i.e. on a 30 times larger scale than in the case of Examples 4-6).

EXAMPLE 8

This experiment was carried out as in Example 3 except that an aqueous solution of ammonia was used as the base instead of NaOH.

EXAMPLE 9

2.18 moles (433.4 g of $FeCL_2.4H_2O$) are dissolved in fully demineralized water to give 2.7 l of solution, which is introduced into a 6 l glass vessel whilst introducing nitrogen at the rate of 250 l/h. 2.18 moles of NaOH (87.25 g), dissolved in fully demineralized water to give 1.3 l of solution, are introduced in the course of 10 minutes at 28° C., whilst stirring at 400 rpm. After completion of the precipitation, stirring is continued for 10 minutes under $N_2$.

The oxidation is then carried out at 28° C. by introducing air at the rate of 150 l/h until the pH has fallen to 3.2. The orange suspension of nuclei is now heated to 40° C. and the amount of air is then increased to 400 l/h. The pH is brought to 5.5 by adding aqueous sodium hydroxide solution and is maintained at this value, up to the end of the reaction, by continuously adding further aqueous sodium hydroxide solution.

The properties of the iron(III) oxide hydroxides obtained as described in Examples 1-9 are shown in Table 1.

TABLE 1

| Example | X-ray examination % by weight | | Length-to-width ratio | Specific surface area, $m^2/g$ |
|---|---|---|---|---|
| | goethite | lepido-crocite | | |
| 1 | 100 | — | 15 | 39.2 |
| 2 | 100 | — | 16 | 61.4 |
| 3 | — | 100 | 20 | 76.7 |
| 4 | 9 | 91 | 34 | 63.5 |
| 5 | 16 | 84 | 31 | 47.8 |
| 6 | 7 | 93 | 31 | 32.0 |
| 7 | 5 | 95 | 26 | 49.4 |
| 8 | — | 100 | 14 | 67.7 |
| 9 | — | 100 | 14 | 39.7 |

EXAMPLE 10

The oxide hydroxides of Examples 1-6, 8-9 and 13 were employed. 100 g of each iron(III) oxide hydroxide are dispersed in 2,500 ml of methanol in which 7.6 g of barium acetylacetonate have been dissolved. After evaporating off the methanol, the powder is dried at 120° C. under reduced pressure. The barium content, based on the oxide hydroxide, is from 2.8 to 3.1% by weight.

About 10 g of each of the treated dried iron(III) oxide hydroxides are reduced with 100 l of $H_2$ per hour at from 275° to 380° C.; after 8 hours, iron pigments having the properties shown in Tables 2 and 3 are obtained.

EXAMPLE 11

100 g of the iron(III) oxide hydroxide of Example 5 are dispersed in 2 l of methanol, and 4 g of barium hydroxide octahydrate dissolved in 300 ml of water are added. 5 g of $H_2C_2O_4.2H_2O$ dissolved in 100 ml of $H_2O$ are introduced. After evaporating off the solvent, the iron(III) oxide hydroxide is dried at 120° C. under reduced pressure and reduced to the iron pigment as described in Example 10. The magnetic properties of the resulting pigment are shown in Table 2.

EXAMPLE 12

5 kg of the pigment from Example 7 are introduced, whilst stirring, into 40 l of water in a 60 l vessel. After dispersing the pigment for 10 minutes, 200 g of technical-grade $Ba(OH)_2.8H_2O$, dissolved in 5 l of water, are added, followed by 250 g of oxalic acid ($H_2C_2O_4.2H_2O$). After completion of the dispersion, the water is filtered off and the treated iron(III) oxide hydroxide is dried at 120° C. under reduced pressure. 500 g of the dry treated iron(III) oxide hydroxide were reduced to the iron pigment with 1,000 l of hydrogen at 380° C. The magnetic properties of this material are shown in Table 2.

EXAMPLE 13

Further iron(III) oxide hydroxide prepared as described in Examples 4-6 were mixed together. The specific surface area of this mixture was 47.7 $m^2/g$. X-ray examination showed the presence of 96% by weight of lepidocrocite and 4% by weight of goethite. The length-to-width ratio was 30:1. After treating and drying the oxide hydroxide as described in Example 10, 500 g portions of the material obtained were reduced at 325° C. with 1,000 l of $H_2/h$, then passivated at 22° C. with a mixture of 1 part by volume of air and 10 parts by volume of $N_2$ (the magnetic properties of the resulting powders are shown in Tables 2 and 3) and thereafter employed to manufacture magnetic tape. The magnetic particles could be oriented exceptionally easily; the orientation ratio was 3.4:1 and the relative remanence $M_r/M_m$ in the direction of orientation was 0.84. As compared with a prior art magnetic tape, the magnetic tape containing the pigment of the invention showed an increase in the maximum output level at long wavelengths, $A_T$, i.e. in the tape flux in the case of a recording frequency of 333 c/s with a cubic distortion of 5%, of 2 db, whilst the maximum output level at short wavelengths $A_H$, i.e. the tape flux in the case of a recording frequency of 10 kc/s, was only reduced by 3 db.

EXAMPLE 14

Part of the iron(III) oxide hydroxide obtained as described in Example 4 and treated as described in Example 10 was dehydrated for 1 hour at 500° C. and then reduced with hydrogen. The magnetic properties of the resulting powder are shown in Tables 2 and 3.

EXAMPLE 15

The iron(III) oxide hydroxide of Example 4 was dehydrated for 1 hour at 500° C. and then treated and dried as described in Example 10. Thereafter, it was reduced to the iron pigment with $H_2$.

The magnetic properties of the iron pigments, measured at a field strength of 160 and 800 kiloamps/m, are shown in Tables 2 and 3 respectively.

TABLE 2

Magnetic properties measured at a field strength of 160 kiloamps/m

| Iron(III) oxide hydroxide Example No. | Treated as described in Example No. | Reduction temperature °C. | $H_{c(\rho=1.6\,g/cm^3)}$ kiloamps/m | $M_{m/\rho}$ nTm³/g | $M_{r/\rho}$ | $\frac{M_r}{M_m}$ | py - pyrophoric pa - passivated |
|---|---|---|---|---|---|---|---|
| 1 | 10 | 325 | 39.8 | 141 | 56 | 0.40 | py |
|   |    | 350 | 51.8 | 165 | 79 | 0.48 | py |
| 2 | 10 | 325 | 20.8 | 75 | 34 | 0.45 | py |
|   |    | 350 | 26.3 | 87 | 38 | 0.44 | py |
| 3 | 10 | 325 | 68.7 | 115 | 66 | 0.57 | py |
|   |    |     | 70.5 | 112 | 64 | 0.57 | pa |
| 4 | 10 | 300 | 77.4 | 137 | 81 | 0.59 | py |
|   |    |     | 80.6 | 106 | 64 | 0.60 | pa |
|   |    | 325 | 76.2 | 123 | 70 | 0.57 | py |
|   |    | 350 | 74.0 | 130 | 73 | 0.56 | py |
| 14 | 10 | 350 | 71.5 | 170 | 96 | 0.56 | py |
|    |    |     | 75.1 | 103 | 58 | 0.56 | pa |
| 15 | 10 | 325 | 68.9 | 133 | 80 | 0.60 | py |
|    |    | 350 | 66.3 | 145 | 88 | 0.61 | py |
| 5 | 10 | 300 | 71.6 | 144 | 89 | 0.62 | py |
|   |    |     | 73.0 | 116 | 73 | 0.63 | pa |
| 5 | 11 | 275 | 67.0 | 142 | 85 | 0.60 | py |
|   |    | 300 | 65.0 | 135 | 83 | 0.61 | py |
| 6 | 10 | 300 | 66.3 | 134 | 77 | 0.57 | py |
| 7 | 12 | 350 | 66.6 | 130 | 69 | 0.53 | py |
|   |    | 380 | 69.0 | 125 | 67 | 0.54 | py |
| 8 | 10 | 350 | 55.0 | 142 | 78 | 0.55 | py |
| 9 | 10 | 310 | 57.8 | 125 | 66 | 0.53 | py |
|   |    | 350 | 57.4 | 134 | 74 | 0.55 | py |
| 13 | 10 | 325 | 71.8 | 103 | 63 | 0.61 | pa |

TABLE 3

Magnetic properties at a field strength of 800 kiloamps/m

| Iron(III) oxide hydroxide Example No. | Treated as described in Example No. | Reduction temperature °C. | $M_{S/\rho}$ nTm³/g | $\frac{M_R}{M_S}$ | $H_{c(\rho=1.6\,g/cm^3)}$ | $h_5$ | $h_{25}$ | Orientation ratio of passivated pigments | py = pyrophoric pa = passivated |
|---|---|---|---|---|---|---|---|---|---|
| 3 | 10 | 325 | 199 | 0.49 | 103.3 | 1.73 | 0.59 |     | py |
|   |    |     | 195 | 0.49 | 104.4 | 1.63 | 0.60 | 2.1 | pa |
| 4 | 10 | 300 | 222 | 0.49 | 107.0 | 1.54 | 0.52 |     | py |
|   |    |     | 173 | 0.50 | 106.0 | 1.51 | 0.49 | 3.4 | pa |
|   |    | 325 | 221 | 0.47 | 109.1 | 1.58 | 0.54 |     | py |
|   |    | 350 | 233 | 0.41 | 110.4 | 1.67 | 0.54 |     | py |
| 14 | 10 | 350 | 317 | 0.48 | 108.8 | 1.60 | 0.57 |     | py |
| 15 | 10 | 350 | 234 | 0.47 | 91.5 | 1.75 | 0.61 |     | py |
| 5 | 10 | 300 | 236 | 0.48 | 95.4 | 1.58 | 0.55 |     | py |
|   |    |     | 182 | 0.50 | 95.7 | 1.47 | 0.51 | 4.2 | pa |
| 9 | 10 | 350 | 237 | 0.44 | 90.2 | 1.95 | 0.69 |     | py |
| 13 | 10 | 325 | 187 | 0.48 | 86.1 | —    | 0.58 | 4.3 | pa |

We claim:

1. A process for the manufacture of acicular ferromagnetic iron particles, which process comprises reducing an acicular iron(III) oxide hydroxide which carries on the surface of its particles a compound of calcium, strontium or barium and a monobasic, dibasic or tribasic aliphatic carboxylic acid of up to 6 carbon atoms or a chelate of calcium, strontium or barium and an organic compound containing at least two groups capable of chelating a calcium, strontium or barium cation, the reduction being carried out with hydrogen at from 275° to 380° C. and the acicular iron(III) oxide hydroxide having a length-to-width ratio of at least 15:1 and consisting of at least 70% by weight of lepidocrocite.

2. A process as claimed in claim 1, wherein the acicular iron(III) oxide hydroxide has a length-to-width ratio of at least 15:1 and consists of a mixture of goethite and at least 70% by weight of lepidocrocite.

3. A process as claimed in claim 1, wherein the particle surfaces carry the alkaline earth metal/carboxylic acid compound or the chelate in a total collective amount of from 0.2% to 10% by weight of the total amount of acicular iron(III) oxide hydroxide.

4. A process as claimed in claim 1, wherein the acicular iron(III) oxide hydroxide has a length-to-width ratio of at least 15:1 and consists of lepidocrocite or of a mixture of goethite and at least 70% by weight of lepidocrocite, and wherein the particle surfaces carry from 0.2% to 10% by weight of a precipitate of a barium salt of an aliphatic dicarboxylic acid of up to 6 carbon atoms.

5. A process as claimed in claim 1, wherein the acicular iron(III) oxide hydroxide has a length-to-width ratio of at least 15:1 and consists of a mixture of goethite and at least 70% by weight of lepidocrocite, and wherein the particle surfaces carry from 0.2 to 10% by weight of a chelate of a soluble barium salt and acetylacetone.

* * * * *